(12) United States Patent
Hu et al.

(10) Patent No.: US 12,366,765 B1
(45) Date of Patent: Jul. 22, 2025

(54) AUTOSTEREOSCOPIC DISPLAY APPARATUS

(71) Applicant: JoyVision Technology., CO LTD, Taoyuan (TW)

(72) Inventors: Cheng-Chung Hu, Taoyuan (TW); Han-Hsun Kuo, Taoyuan (TW)

(73) Assignee: JOYVISION TECHNOLOGY., CO LTD, Taoyuan (TW)

( * ) Notice: Subject to any disclaimer, the term of this patent is extended or adjusted under 35 U.S.C. 154(b) by 0 days.

(21) Appl. No.: 19/068,197

(22) Filed: Mar. 3, 2025

(51) Int. Cl.
G02B 30/28 (2020.01)

(52) U.S. Cl.
CPC .................... G02B 30/28 (2020.01)

(58) Field of Classification Search
None
See application file for complete search history.

(56) References Cited

U.S. PATENT DOCUMENTS

| 2008/0117231 A1* | 5/2008 | Kimpe | G09G 3/20 345/629 |
| 2024/0112628 A1* | 4/2024 | Hou | G09G 3/3208 |

\* cited by examiner

Primary Examiner — Jyotsna V Dabbi
(74) Attorney, Agent, or Firm — McClure, Qualey & Rodack, LLP

(57) ABSTRACT

An autostereoscopic display apparatus includes an array of display pixels arranged in rows and columns; an array of elongated optical elements extending parallel to one another and overlying the display pixels, wherein the optical elements are slanted at an angle relative to the columns of display pixels; for any given display pixel, an optimized brightness is determined based on the distance between the pixel and the nearest end of a boundary separating adjacent images. By adjusting pixel brightness, the apparatus effectively reduces image crosstalk, thereby enhancing the clarity and quality of autostereoscopic displays.

2 Claims, 11 Drawing Sheets

AUTOSTEREOSCOPIC DISPLAY APPARATUS

CROSS-REFERENCE TO RELATED APPLICATIONS

This non-provisional application claims priority under 35 U.S.C. § 119 (a) on Patent Application No(s). 113142612 filed in Taiwan, Republic of China on Nov. 6, 2024, the entire contents of which are hereby incorporated by reference.

PRIOR ART

When producing glasses-free 3D visuals with lenticular lenses, the aim is to distinctly channel light into separate colors, delivering unique images to each eye. However, crosstalk (where images intended for one eye bleed into the other) can occur at the boundaries, causing visual disturbances like ghosting. To address this, adjusting screen pixel brightness by deactivating pixels near the edges of the lenticular lens pitch can help reduce crosstalk, resulting in a clearer 3D image. The technique of deactivating pixels near lenticular lens pitches is well established in the art and is described in Patent CN110662012A. However, excessive pixel deactivation may lead to a reduction in overall display brightness, and viewers may perceive black grid patterns, resembling a screen door effect, during 3D viewing.

BACKGROUND OF THE INVENTION

The present invention optimizes brightness dynamically, ensuring clearer, high-quality autostereoscopic displays while reducing crosstalk artifacts.

SUMMARY OF THE INVENTION

It is an object of the present invention to provide an improved autostereoscopic display apparatus. According to the present invention, there is provided an autostereoscopic display apparatus, comprising: an array of display pixels arranged in rows and columns; and an array of elongated optical elements extending parallel to one another and overlying the display pixels, wherein the optical elements are slanted at an angle relative to the columns of display pixels; for any given display pixel, an optimized brightness is determined based on the distance from the given pixel to the nearest end of a boundary separating adjacent images. In a preferred embodiment, the adjacent images include a plurality of pixel sets, and through which the pixel sets are viewed, the optical elements acting as optical directing means to provide separate images to a viewer's eyes, thereby providing an autostereoscopic display to the viewer.

In another preferred embodiment, the optical element is a liquid crystal lens, including a plurality of lens units which repeatedly create groups of display pixels separated by boundaries between adjacent images. In one embodiment, starting from the pixels near said boundary, the brightness of each pixel is progressively increased. In another embodiment, a system for providing separate images to a viewer's eyes to thereby provide an autostereoscopic display to the viewer, the system comprising: an autostereoscopic display apparatus comprising means for producing a display which comprises an array of display pixels arranged in rows and columns, and an array of elongated lenticular elements extending parallel to one another overlying the display pixel array and through which the display pixels are viewed, the lenticular elements acting as optical directing means to provide separate images to a viewer's eyes to thereby provide an autostereoscopic display to the viewer, the lenticular elements having a pitch greater than a distance from the pixel to the nearest end of a boundary between adjacent images in the row direction.

In another embodiment, the autostereoscopic display apparatus consists of a display pixel array arranged in rows and columns. Above this array, an array of elongated optical elements (e.g., lenticular lenses or liquid crystal lenses) is positioned in a Z-direction, slanted at an angle relative to the display pixel columns. These optical elements direct different pixel sets to each of the viewer's eyes, enabling autostereoscopic 3D viewing without glasses.

To reduce crosstalk, brightness optimization is applied. For any given display pixel, brightness is determined by its distance from the nearest boundary separating adjacent images. The brightness increases progressively from boundary pixels toward the central pixels of each viewpoint image (which have minimal crosstalk and are set to the highest brightness).

In an alternative embodiment, liquid crystal lenses replace the optical elements. These lenses extend in a third direction, repeatedly forming groups of display pixels, separated by boundaries between adjacent images. This approach further enhances the autostereoscopic effect. The proposed system effectively reduces crosstalk and improves 3D image clarity by dynamically adjusting pixel brightness based on their position relative to image boundaries.

Preferably, the optimized brightness is determined based on the following equations: $B=1/(1+e^{\wedge}(-C*(D-0.5)))$, wherein in equation, C is a coefficient greater than 0, D is a ratio of said distance to a pitch of the optical elements, and B is a ratio of the optimized brightness of any given pixel to the maximum brightness of said any given pixel.

In view of that, the brightness of each pixel can be finely adjusted according to its distance and the chosen control coefficient C. Depending on the properties of the optical element, adjust the control coefficient to achieve varying crosstalk reduction effects. These and other objectives of the present invention will no doubt become obvious to those of ordinary skill in the art after reading the following detailed description of the preferred embodiment that is illustrated in the various figures and drawings.

DETAILED DESCRIPTION OF THE INVENTION

Reference will now be made in detail to embodiments, examples of which are illustrated in the accompanying drawings. In the following detailed description, numerous specific details are set forth to provide a thorough understanding of the present invention. However, it will be apparent to one of ordinary skill in the art that the present invention may be practiced without these specific details. In other instances, well-known methods, components, have not been described in detail so as not to unnecessarily obscure aspects of the embodiments.

Figure 1A:
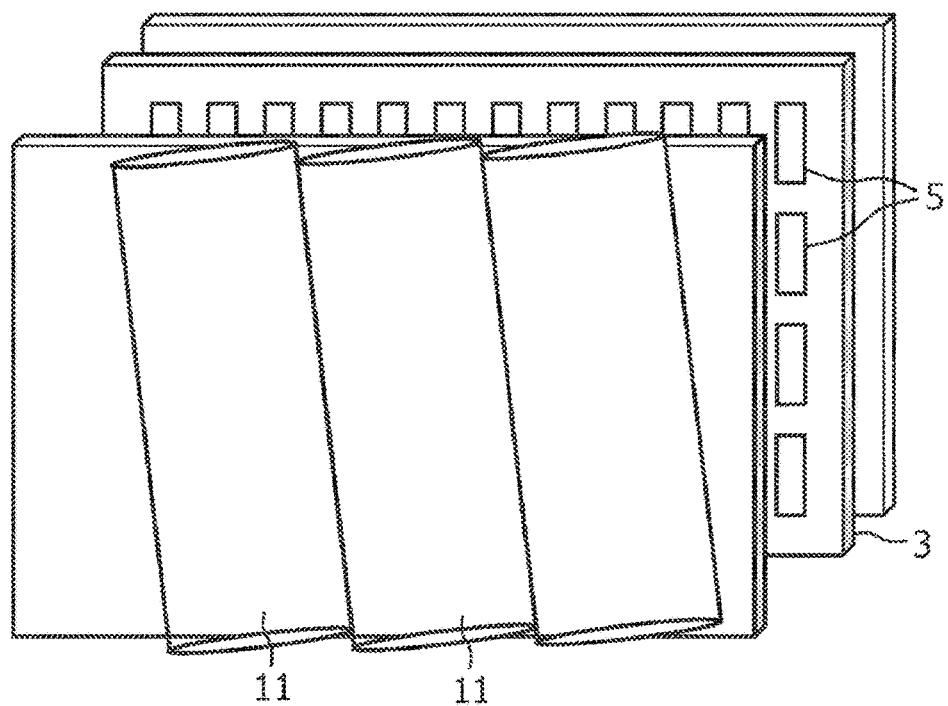
FIGS. 1A-1B illustrate a conventional autostereoscopic display.
Figure 1B:
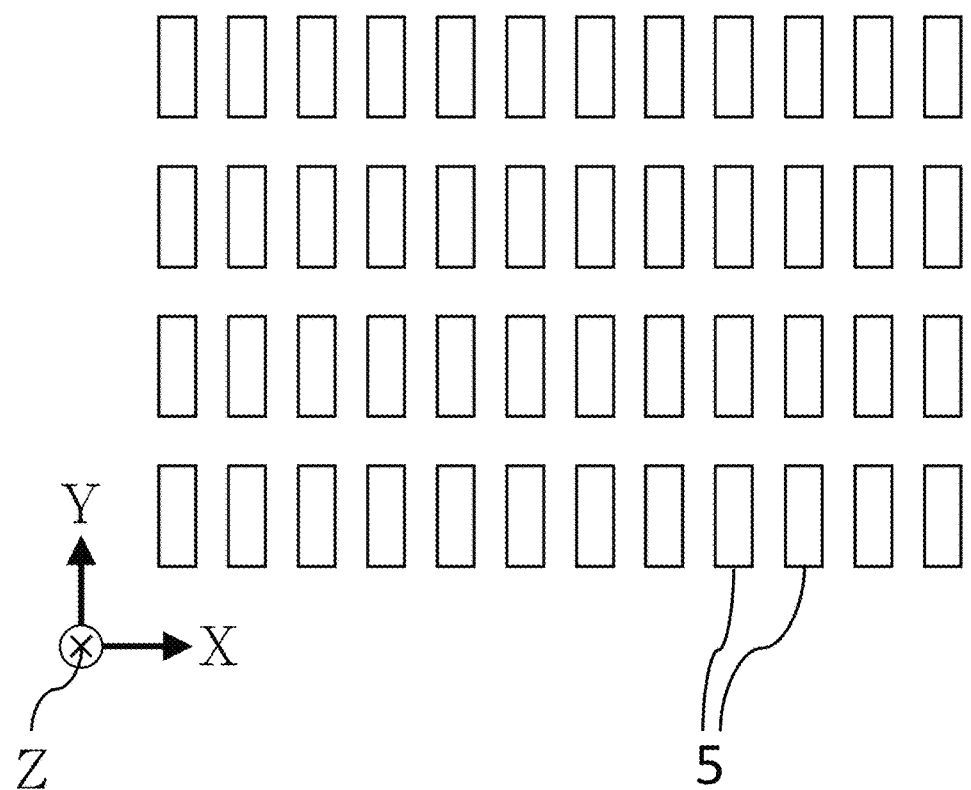
Figure 2A:
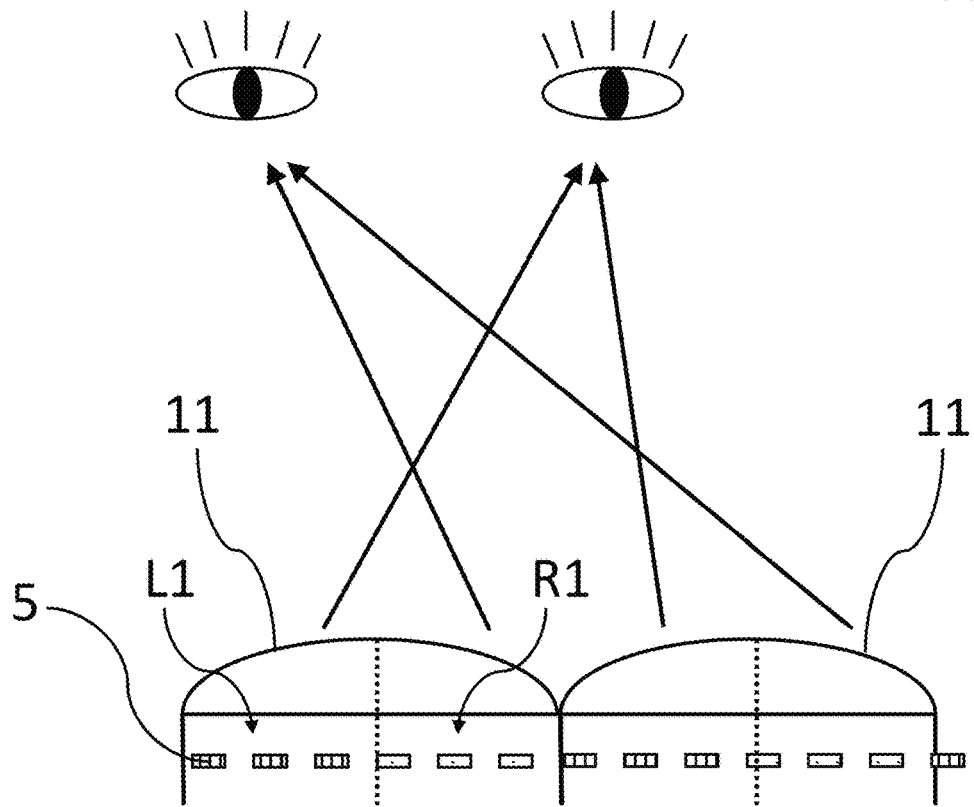
FIGS. 2A-2B provide schematic plan views of a typical autostereoscopic display.
Figure 2B:
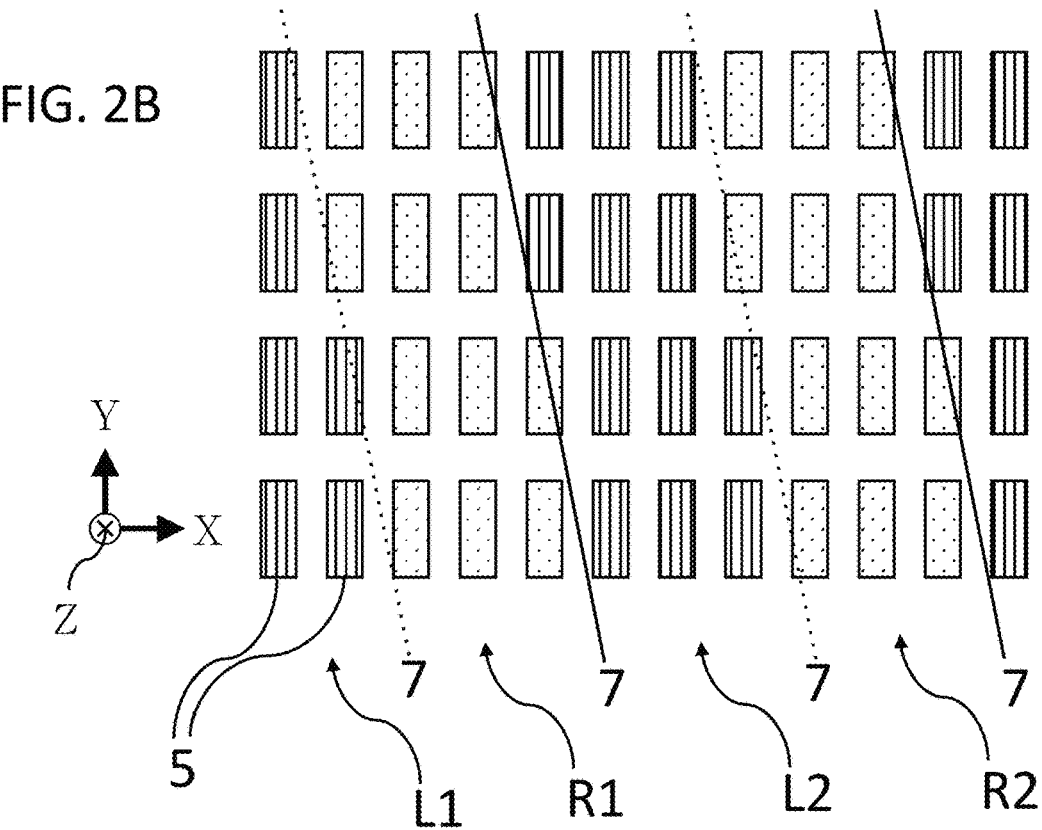

As shown in FIGS. 1A and 1B, an autostereoscopic display apparatus includes an array 3 of display pixels 5 arranged in rows and columns. The array 3 is structured along a row direction (X-axis) and a column direction (Y-axis). Positioned in a Z direction (perpendicular to both the X and Y directions) is another array of elongated optical elements 11. These optical elements are aligned parallel to one another and overlie the display pixel array 3. As illustrated in FIGS. 2A and 2B, the display pixels 5 are viewed through the optical elements 11, which function to direct separate images (e.g., pixel sets R1, R2, L1, L2) to the viewer's eyes, thereby enabling autostereoscopic 3D viewing.

Figure 3:
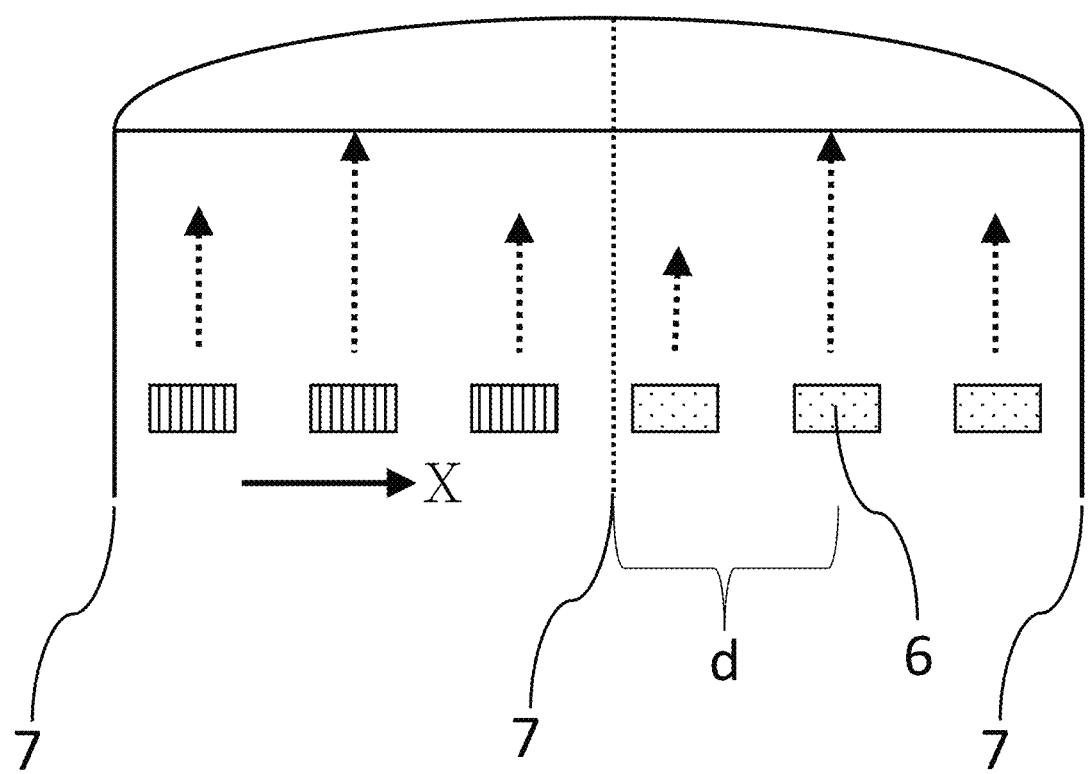
FIG. 3 illustrates an embodiment of the apparatus that determines optimized brightness based on the distance from a given pixel to the nearest boundary end.

The optical elements 11 are slanted at an angle relative to the display pixel columns (Y-axis) to optimize the separation of visual information, thereby repeatedly creating groups of display pixels (e.g., pixel sets R1, R2, L1, L2), each of which consists of adjacent display pixels 5. Slanted structures of autostereoscopic display are well known in the art and described in U.S. Pat. U.S. Pat. No. 6,064,424A. More prior art can be found in Classification G02B30/27—Optical systems or apparatus for producing three-dimensional [3D] effects, e.g., stereoscopic images by providing first and second parallax images to an observer's left and right eyes in autostereoscopic displays involving lenticular arrays. Additional prior art can be found in Classification H04N13/317—Image reproducers for viewing without the aid of special glasses, i.e., using autostereoscopic displays with slanted parallax optics As shown in FIG. 3, for any given pixel 6 of the display pixels, an optimized brightness may be determined based on a distance d from given pixel 6 to the nearest end (in the row direction X) of a boundary 7 separating adjacent images. Referring back to FIGS. 2A, 2B, the adjacent images include a plurality of pixel sets (e.g., pixel sets R1, L1, L2, R2), and through which the pixel sets are viewed, the optical elements acting as optical directing means to provide separate images to a viewer's eyes, thereby providing an autostereoscopic display to the viewer.

Figure 4A:
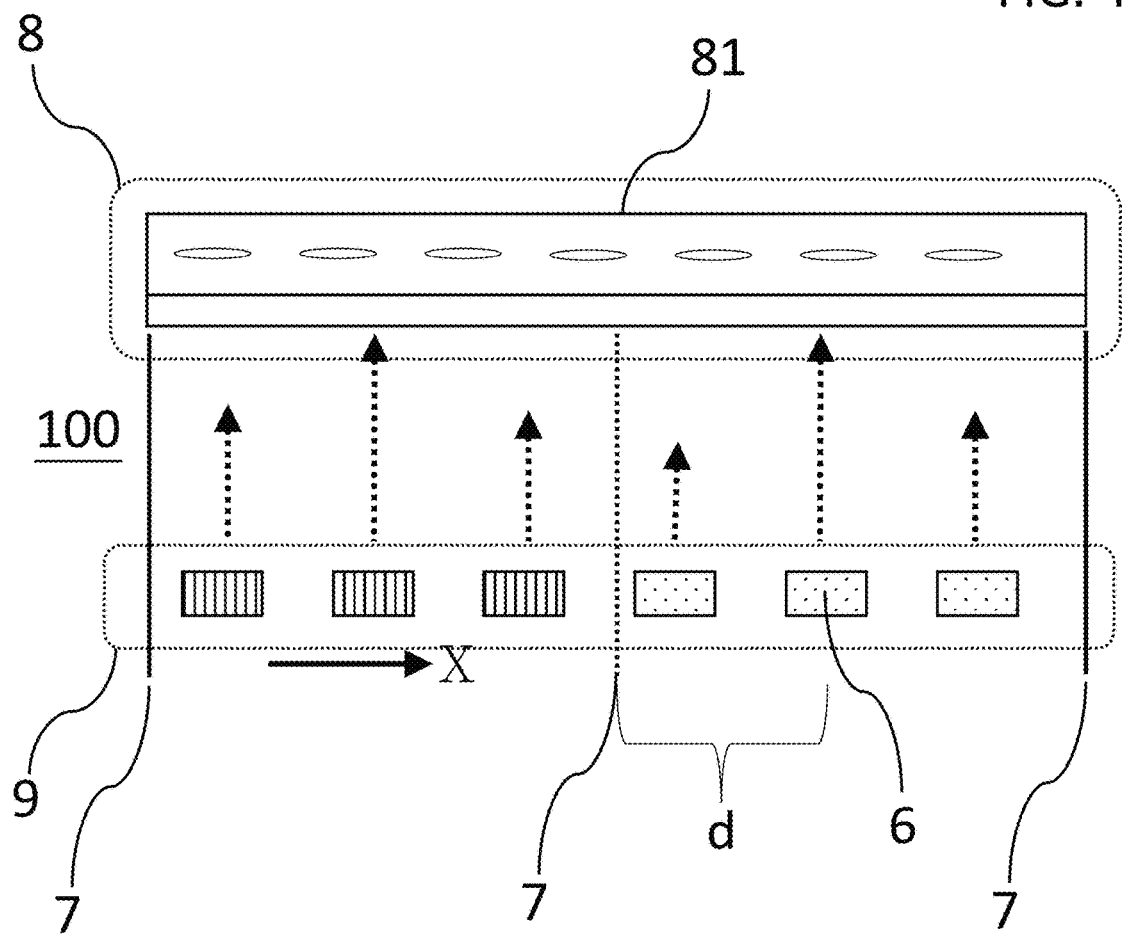
FIGS. 4A-4B depict a liquid crystal lens that repeatedly forms groups of display pixels, separated by boundaries.
Figure 4B:
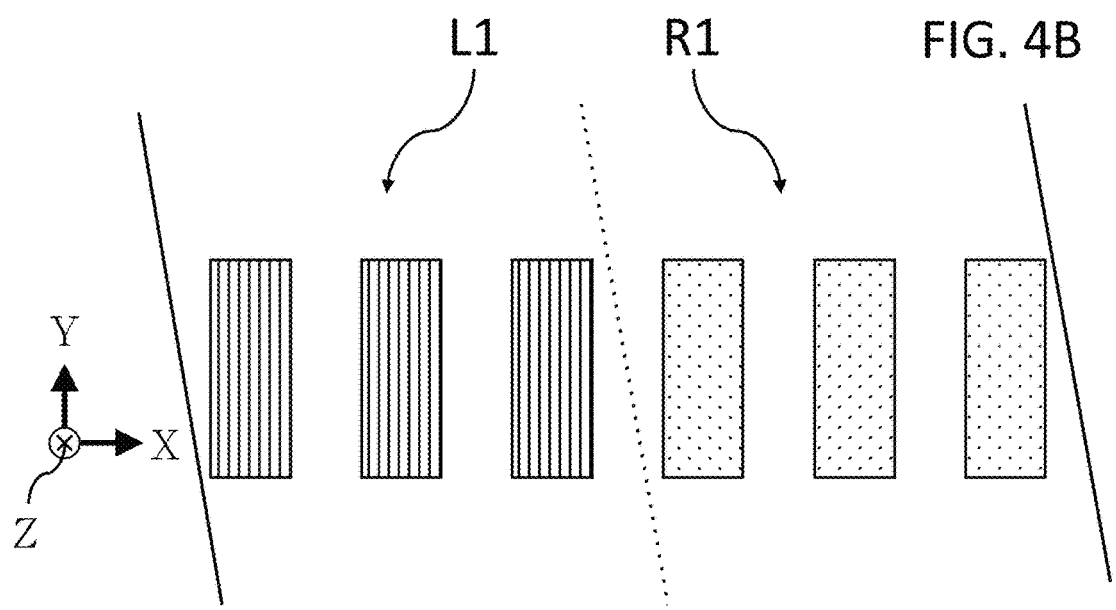

In another embodiment, as depicted in FIGS. 4A and 4B, the optical elements may be a liquid crystal lens 8 (known in the art and described in U.S. Pat. U.S. Pat. No. 8,581,815B2). A display device 100 may comprise a display panel 9 configured to generate images and comprising a display surface having the row direction X and the column direction Y substantially perpendicular to the row direction X; the liquid crystal lens 8 may be disposed on the display panel 9, and comprises a plurality of lens units 81 each of which may extend in a third direction crossing the column direction Y. The plurality of lens units 81 repeatedly create groups of display pixels (e.g., pixel sets R1, L1). The plurality of groups of display pixels are separated by boundaries 7 between adjacent images.

Figure 5:
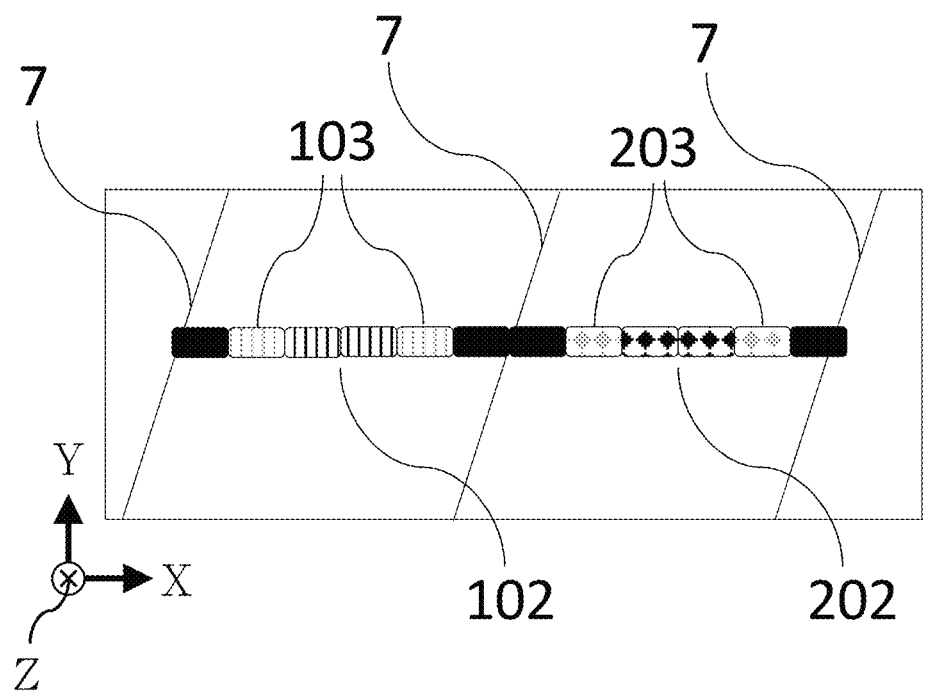
FIG. 5 illustrates another embodiment, where pixels located between a boundary and a set of central pixels are dimmed relative to the central pixels of each image.

In an embodiment, refer to FIG. 5, in the row direction X, the brightness of each pixel is gradually increased. The central pixels of each viewpoint image, 102 and 202, experience the least crosstalk; therefore, they are set to the highest brightness. Starting from the pixels near boundary 7, the brightness of each pixel is progressively increased. For example, the pixels 103, 203 (which are located between boundary 7 and the central pixels 102, 202) are set to a lower brightness than the central pixels 102, 202 of each viewpoint image. In view of that, starting from the pixels near said boundary, the brightness of each pixel may be progressively increased; the pixels which are located between any boundary and any central pixel may be set to a lower brightness than the central pixels of each image.

Figure 6A:
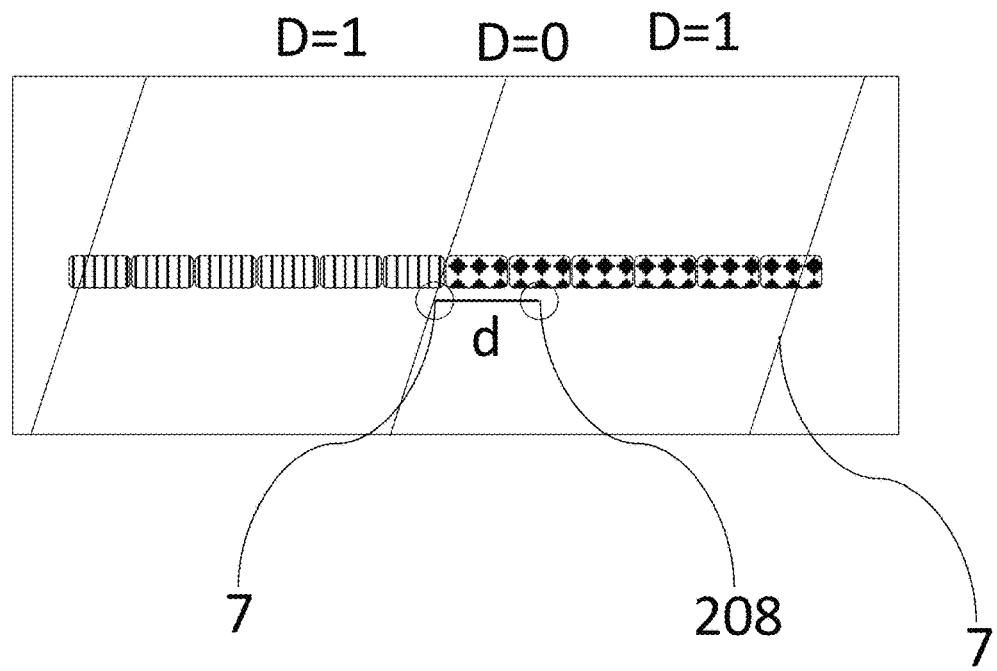
FIGS. 6A-6E present another embodiment incorporating an equation for calculating the optimized brightness of any given pixel.
Figure 6B:
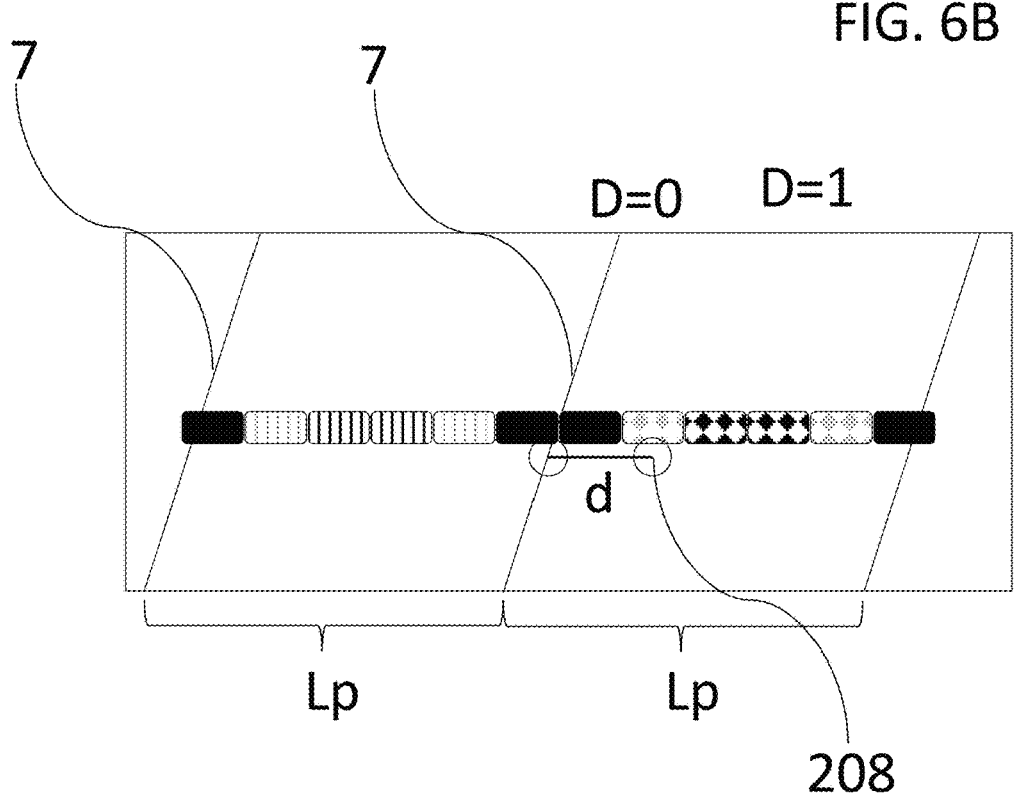

In another embodiment, as shown in FIG. 6A, an equation may be used to calculate the display brightness of each pixel. For any given pixel (e.g., pixel 208), its distance from the nearest boundary 7 between adjacent viewpoint images is measured and used as an input D for equation. The equation then determines the appropriate brightness level for the pixel. Since the central pixels of each viewpoint image experience the least crosstalk, the equation is designed such that when D=1, the output reaches its maximum value of 1. In view of that, the optimized brightness may be determined based on a following equation: $B=1/(1+e^{(-C*(D-0.5))})$, wherein in equation: C is a coefficient greater than 0; D is a ratio of said distance (from given pixel to the nearer end of boundaries) to a pitch Lp (i.e., the pitch between adjacent boundaries 7, which separate those adjacent images made from different pixel sets) of the optical elements as shown in FIG. 6B; and B is a ratio of the optimized brightness of any given pixel to the maximum brightness of any given pixel.

Figure 6C:
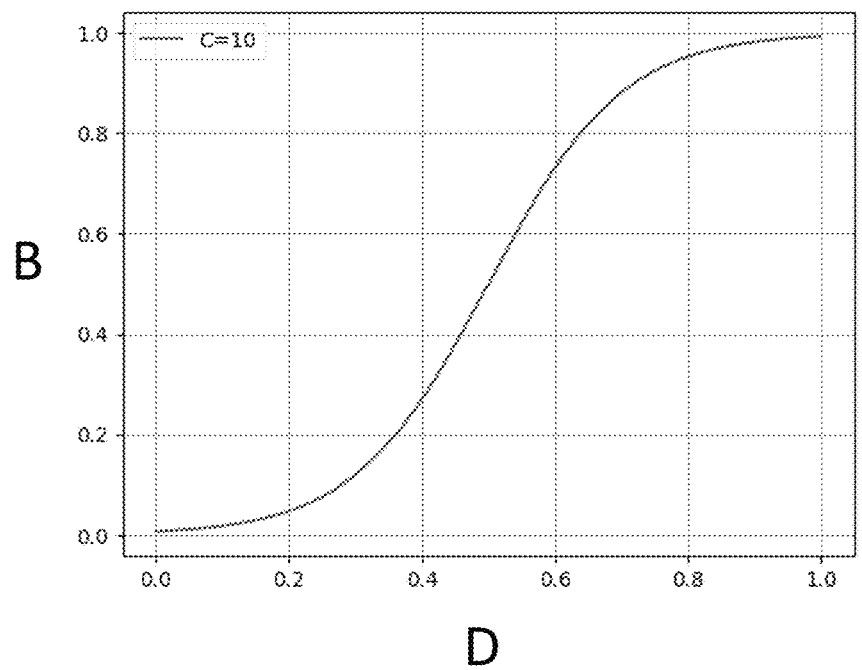
Figure 6D:
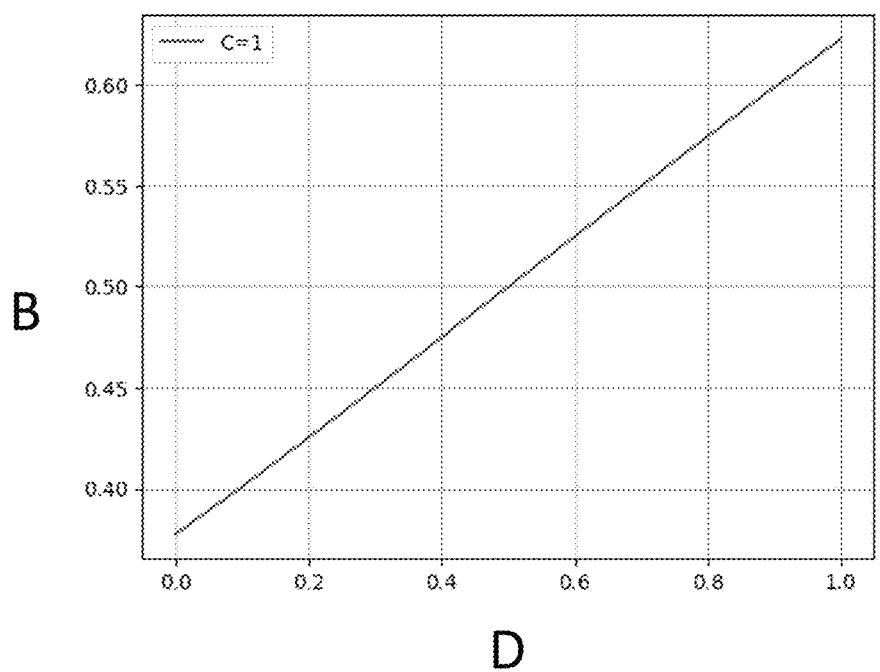
Figure 6E:
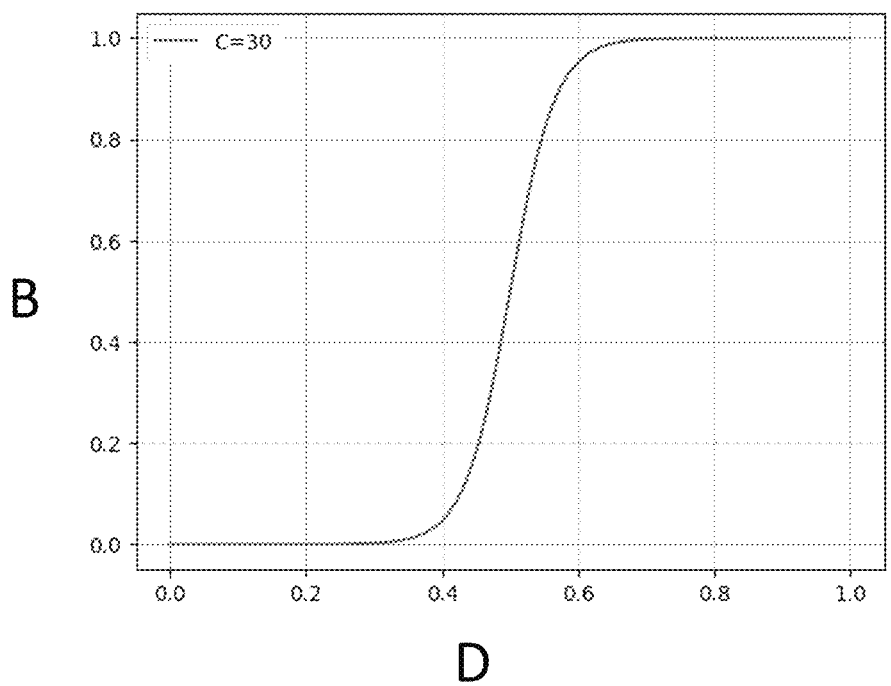

Depending on the characteristics of optical element, different control coefficient C may be used to achieve varying levels of crosstalk reduction. In a preferred embodiment, C is set to be greater than 10, as values above this threshold ensure that when D=1, the output approaches 1 (refer to FIG. 6C). However, the control coefficient C can still be adjusted as needed based on specific requirements. For example, in FIG. 6D, C is set to be 1; in FIG. 6E, C is set to be 30. The brightness of each pixel can be finely adjusted according to its distance and the chosen control coefficient C. For any given pixel, its distance from the edge of the pitch is calculated and used as the input D for the equation, determining its appropriate brightness level.

Figure 7A:
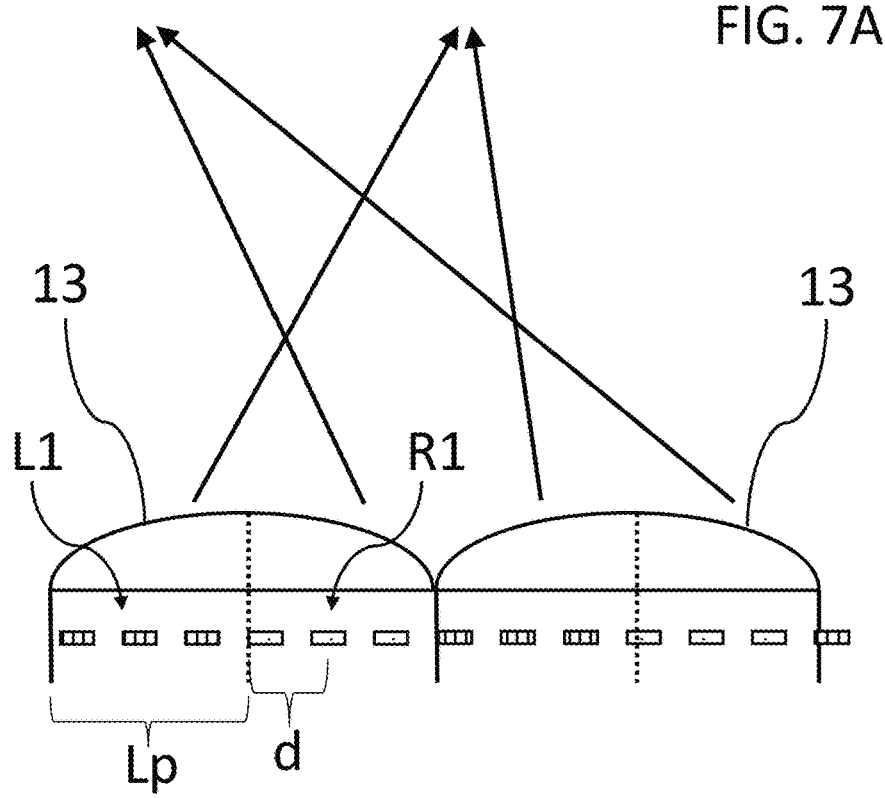
FIGS. 7A-7B illustrate another embodiment featuring a system that delivers separate images to a viewer's eyes, enabling autostereoscopic display.
Figure 7B:
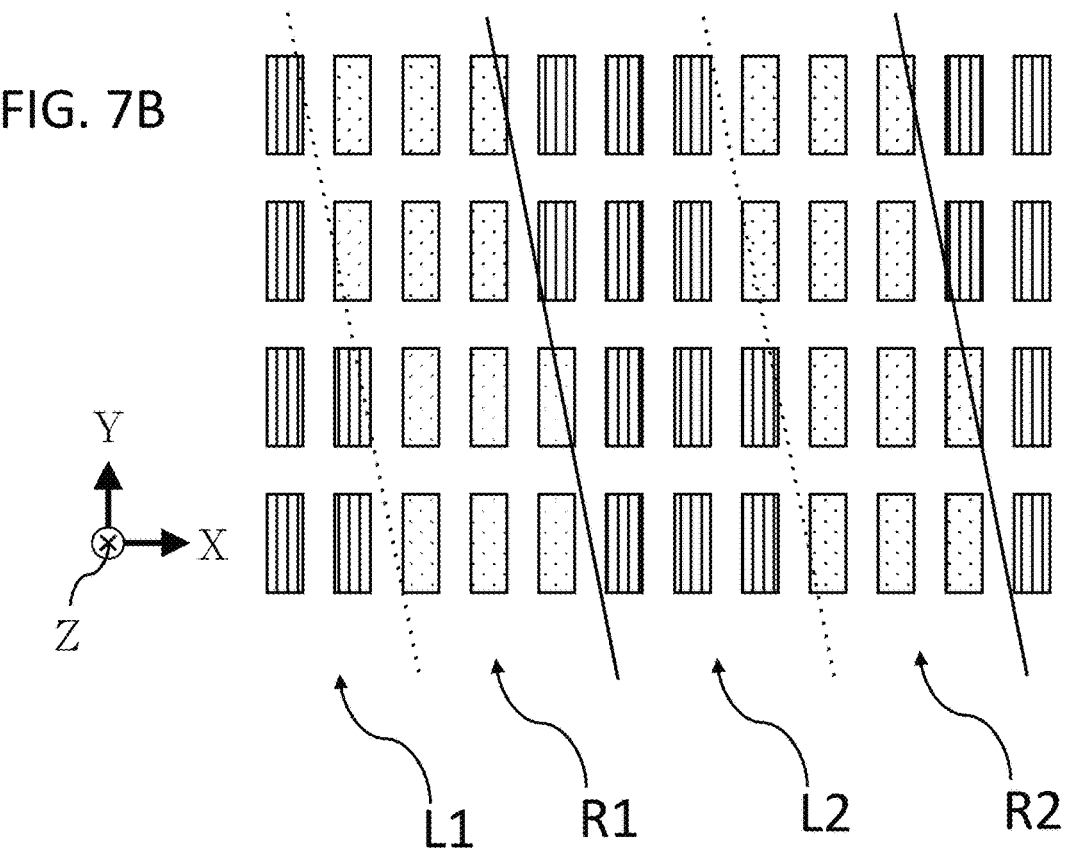

In an embodiment, refer to FIGS. 7A, 7B, a system for providing separate images (e.g., pixel sets L1, R1, L2, R2) to viewer's eyes to thereby provide an autostereoscopic display to the viewer, the system comprising: said autostereoscopic display apparatus comprising means for producing a display which comprises an array of display pixels arranged in rows and columns, and an array of elongated lenticular elements 13 extending parallel to one another overlying the display pixel array and through which the display pixels are viewed, the lenticular elements acting as optical directing means to provide separate images to a viewer's eyes to thereby provide an autostereoscopic display to the viewer, the lenticular elements 13 having the pitch Lp (in the row direction X) greater than the distance d from the pixel to the nearest end of the boundary between adjacent images.

In view of the foregoing, the system may further include the step for calculating ratio B of an optimized brightness to the maximum brightness wherein the ratio is calculated according to equation: $B=1/(1+e^{(-C*(D-0.5))})$, wherein in equation, C is a coefficient greater than 0; D is a ratio of said distance (from given pixel to the nearer end of boundaries) to the pitch Lp (i.e., the pitch between adjacent boundaries, which separate those adjacent images made from different pixels sets) of the optical elements; and B is a ratio of the optimized brightness of any given pixel to the maximum brightness of any given pixel. In short, the autostereoscopic display system includes a display pixel array arranged in rows and columns and an array of lenticular optical elements. These optical elements, having a pitch Lp greater than the pixel-to-boundary distance d, direct separate images to the viewer's eyes, enabling glasses-free 3D viewing.

Figure 8:
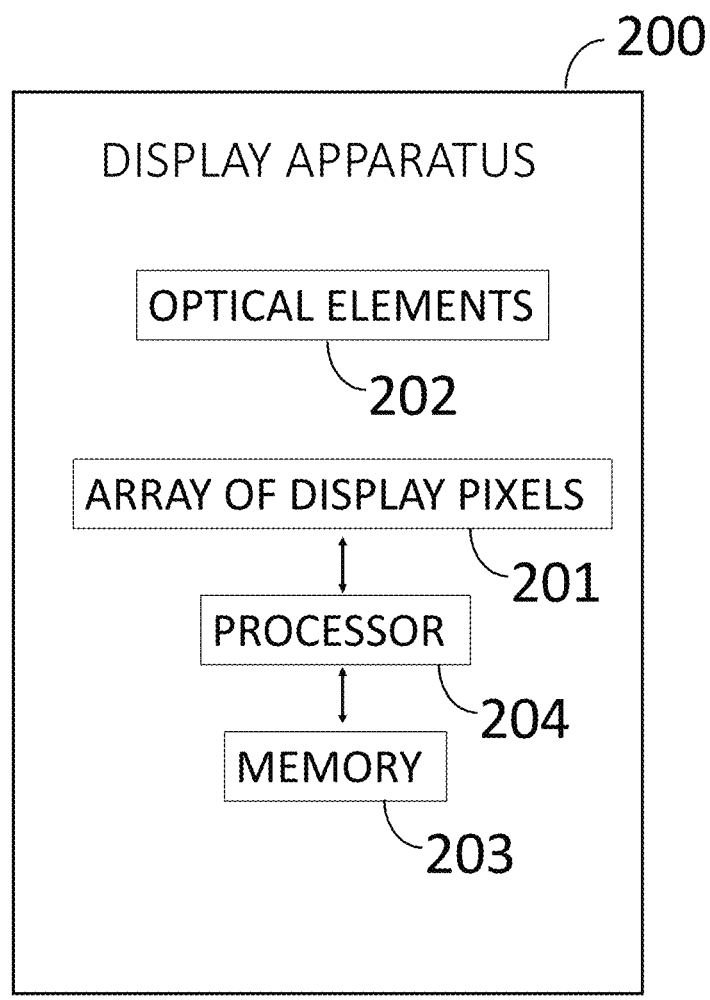
FIG. 8 illustrates another embodiment in which a processor executes computer-readable instructions to provide an autostereoscopic display.

In another embodiment, refer to FIG. 8, a display apparatus 200 may comprise an array of display pixels 201 arranged in rows and columns; an array of elongated optical elements 202 extending parallel to one another and overlying the display pixels; a memory 203 configured to store computer readable instructions; and a processor 204 configured to execute the computer readable instructions such that the processor is configured to, obtain a distance from a given pixel to the nearest end of a boundary separating adjacent images, wherein said adjacent images include a plurality of pixel sets, and through which the pixel sets are viewed, the optical elements acting as optical directing means to provide separate images to a viewer's eyes, thereby providing an autostereoscopic display to the viewer, determine an optimized brightness value of the given pixel based on the following equations: $B=1/(1+e^{(-C*(D-0.5))})$, wherein in equation, C is a coefficient greater than 0, D is a ratio of said distance to a pitch of the optical elements, and B is a ratio of the optimized brightness value to a maximum brightness value of the given pixel.

Figure 9A:
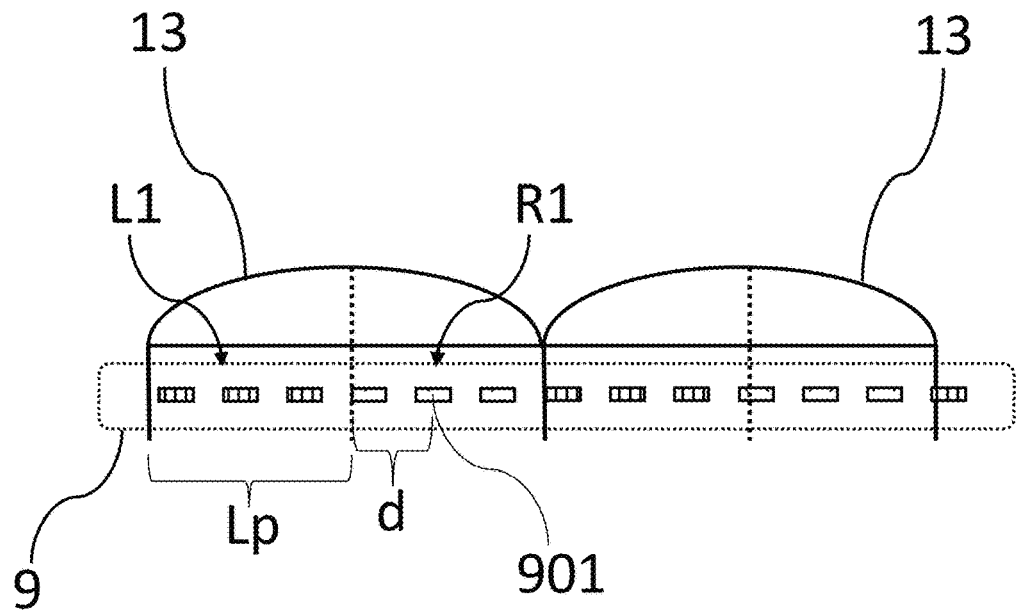
FIGS. 9A-9B present another embodiment utilizing an equation to determine the optimized brightness of any given pixel.
Figure 9B:
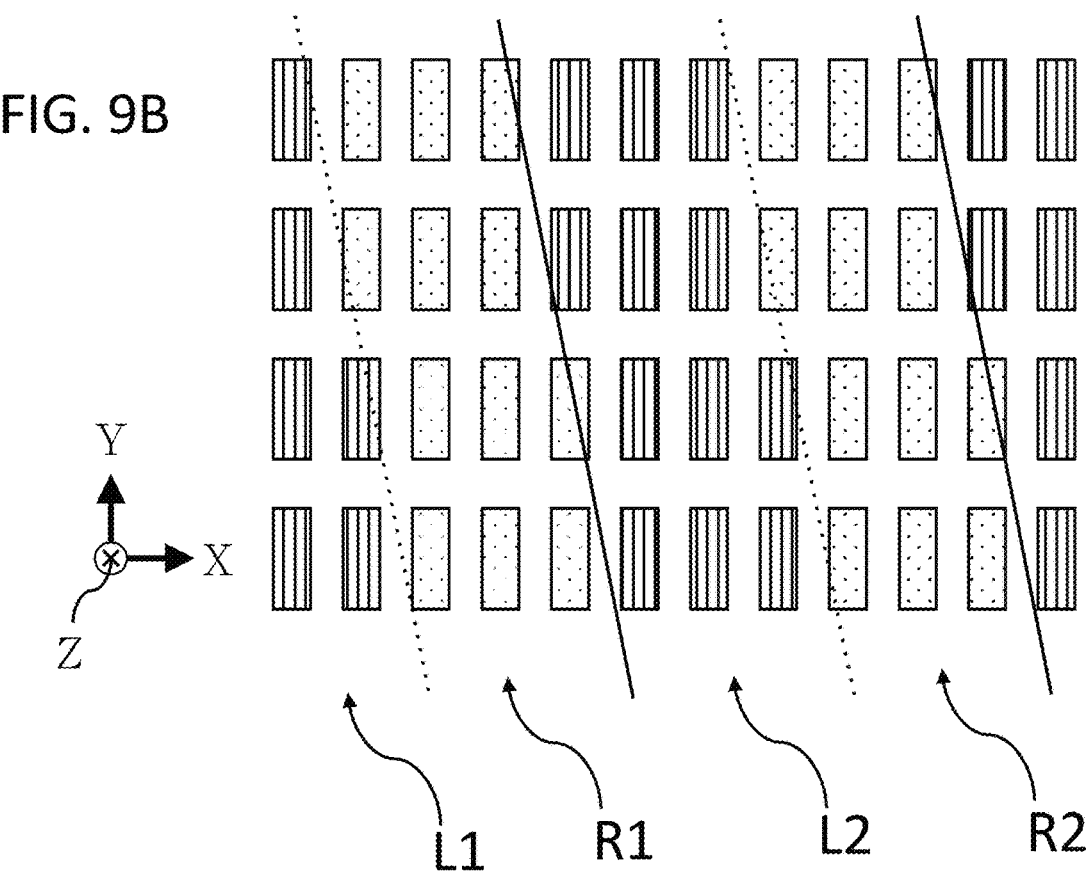

In another embodiment, refer to FIGS. 9A and 9B, a method of determining an optimized brightness value of a given pixel 901, for controlling a display to output a 3D image, wherein the display includes an array 9 of display pixels arranged in rows and columns; and an array of elongated optical elements extending parallel to one another and overlying the display pixels, the method comprising: obtaining a distance d from the given pixel 9 to the nearest end of a boundary separating adjacent images, wherein said adjacent images include a plurality of pixel sets, and through which the pixel sets are viewed, the optical elements acting as optical directing means to provide separate images to a viewer's eyes, thereby providing an autostereoscopic display to the viewer.

The method determines the optimized brightness value based on the equations: $B=1/(1+e^{(-C*(D-0.5))})$, wherein in equation, C is a coefficient greater than 0, D is a ratio of the distance d to a pitch Lp of the optical elements, and B is a ratio of the optimized brightness value to a maximum brightness value of the given pixel 9. In short, the apparatus includes a display pixel array, elongated optical elements, memory, and a processor. The processor calculates the optimized brightness using the equation above, based on the pixel's distance from the nearest boundary. These components involve: obtaining the pixel's distance d to the nearest boundary separating adjacent images; computing the brightness ratio B using the predefined equation; adjusting the brightness accordingly to reduce crosstalk and enhance 3D clarity.

The present invention may enhance the quality of autostereoscopic displays by: providing the system that effectively delivers separate images to a viewer's eyes for an improved 3D viewing experience; reducing crosstalk by optimizing pixel brightness based on the pixel's distance from adjacent image boundaries; introducing a computational model that determines optimized brightness values dynamically using the mathematical equation; developing a display apparatus equipped with memory and a processor to automate brightness optimization; establishing a method to compute and control pixel brightness for 3D image output, ensuring clearer stereoscopic effects. All changes and modifications that fall within the metes and bounds of the claims are intended to be embraced by the appended claims.

The invention claimed is:

1. An autostereoscopic display apparatus, comprising:
an array of display pixels arranged in rows and columns; and
an array of elongated optical elements extending parallel to one another and overlying the display pixels, wherein for any given pixel, an optimized brightness is determined based on a distance between the given pixel and the nearest end of a boundary separating adjacent images, wherein said adjacent images comprise a plurality of pixel sets, through which the pixel sets are viewed, the optical elements acting as optical directing means to provide separate images to a viewer's eyes, thereby enabling an autostereoscopic display, wherein said optical element is a liquid crystal lens, including a plurality of lens units which create plurality of groups of display pixels separated by boundaries between said adjacent images, wherein said optimized brightness is determined based on following equation: $B=1/(1+e^{(-C*(D-0.5))})$, wherein C is a coefficient greater than 0, D is a ratio of said distance to a pitch of the optical elements, and B is a ratio of the optimized brightness to a maximum brightness of the given pixel.

2. A system for providing separate images to a viewer's eyes, the system comprising:
an array of display pixels arranged in rows and columns; and
an array of elongated lenticular elements extending parallel to one another, overlying the display pixel array, and through which the display pixels are viewed, the lenticular elements act as optical directing means to provide separate images to a viewer's eyes, thereby enabling an autostereoscopic display,
wherein the lenticular elements have a pitch greater than a distance from a given pixel to the nearest end of a boundary separating adjacent images in the row direction, and
wherein an optimized brightness value is determined based on said distance and following equation: $B=1/(1+e^{(-C*(D-0.5))})$, wherein C is a coefficient greater than 0, D is a ratio of said distance to said pitch, and B is a ratio of the optimized brightness value to a maximum brightness value of said given pixel.

* * * * *